United States Patent [19]

Petros

[11] Patent Number: 4,714,360
[45] Date of Patent: Dec. 22, 1987

[54] THRUST MECHANISM FOR MILL ROLL BEARING ASSEMBLY

[76] Inventor: Andrew Petros, 620 Oakdale Rd., Oakdale, Pa. 15071

[21] Appl. No.: 915,720

[22] Filed: Oct. 6, 1986

[51] Int. Cl.[4] .............................................. F16C 35/06
[52] U.S. Cl. ................................................... 384/620
[58] Field of Search .............. 384/559, 585, 538, 556, 384/583, 519, 620, 590

[56] References Cited

U.S. PATENT DOCUMENTS 3,239,284  3/1966  Cina et al. .......................... 384/556
3,304,139  2/1967  Toth et al. .......................... 384/556
4,531,847  7/1985  F'Geppert .......................... 384/538

Primary Examiner—Lenard A. Footland
Attorney, Agent, or Firm—Carothers and Carothers

[57] ABSTRACT

A bearing thrust assembly for the support bearings of a roll in a rolling mill including novel longitudinal slack take-up and thrust application structure, a novel locking mechanism for positive retention of the desired thrust adjustment, and a novel assembly of thrust elements that permits installation and removal of the thrust assembly endwise over the free end of the roll neck.

12 Claims, 10 Drawing Figures

THRUST MECHANISM FOR MILL ROLL BEARING ASSEMBLY

BACKGROUND OF THE INVENTION

The present invention relates to a thrust mechanism for mill roll bearings and more particularly to a thrust bearing clamp assembly which can be quickly installed on and removed from mill rolls, work rolls in particular, and which affords quick, reliable thrust adjustment.

During the operation of a rolling mill such as a sheet or strip mill, the mill rolls rotate at high speed to process metal feedstock into a strip or similar configuration. The work rolls of a typical mill may rotate at a speed as high as 500 rpm, for example. Each of the rolls of such a mill is supported in bearing assemblies that are housed in bearing chocks or roll boxes, and which desirably include all of the necessary components for the lubrication, sealing, thrust take-up, and positioning of the respective bearing assemblies. It is highly desirable to provide a quick and convenient manner of positioning, seating, and locking the bearing assemblies on the mill rolls, and particularly on the work rolls of the rolling mill, for the reasons set forth below.

In known rolling mills, particularly cold mills, the terminal speed of the strip or other configuration being rolled may approach 6000 feet per minute. In such mills, the rolling forces may exceed one million pounds. At typically encountered speeds and rolling forces, the mill rolls, and particularly the work rolls, are subject to such enormous wearing forces that in many applications the useful life of the roll surface may be limited to about 4 to 8 hours of mill operation. When this limit is reached, regrinding of the work rolls is required. Thus, on a three shift basis, the work rolls of a mill may be changed as often as 180 times per month per mill stand.

Known procedures for changing work rolls have consumed inordinate amounts of time and labor in withdrawing the worn rolls from each mill stand and replacing them with a set of newly surfaced rolls. Roll changing operations thus cause considerable down time of the rolling mill and attendant loss of production. Additional operating personnel, who are not otherwise necessary for the actual operation of the rolling mill, are also required.

A large proportion of the time involved in roll changing operations typically is occupied in dechocking or stripping the roll bearing assemblies from the worn rolls and installing the bearing assemblies on the replacement rolls. As is evident from the foregoing, mill roll dechocking and rechocking are often repeated operations during normal use of the rolling mill. When assemblying the roll bearings on the mill roll necks, it is necessary to provide convenient means for locating the bearing on the roll neck and for taking up any slack, followed by locking of the bearing and the bearing chock in place. To strip the bearing assemblies from the roll necks, the assembly procedure is of course reversed.

Not only have prior art roll bearing assemblies been difficult and incovenient to assemble and disassemble on the roll necks, they have also been difficult to adjust and to lock in place to maintain the adjustment. The thrust on the roll bearings must be properly adjusted in order to ensure proper roll support during operation. If there is longitudinal clearance in the bearing assembly, the roll will be free to shift longitudinally. This can cause a pumping action of lubricant in the bearings and may permit dirt and other impurities to enter the bearing and thereby cause excess wear and possibly premature bearing failure. By the same token, however, the bearings must not be rigidly clamped in place as there are elements of the bearing assembly which will fail prematurely if not free to move. For example, the inner race of a tapered roller bearing, like those which commonly support a rotary roll in a rolling mill, must be free to rotate slowly in response to circumferentially directed force inputs that result from the rotary motion of the roll in order that the weight of the roll will not continuously be supported by only a small portion of the bearing race located under the roll. Accordingly, it will be seen that adjustment of bearing thrust is a critical aspect of roll bearing removal and replacement as the bearings can be neither too loosely nor too tightly retained on the roll neck.

Not only have prior bearing thrust assemblies been inconvenient to assemble and disassemble, and difficult to adjust, they also have presented difficulties in maintaining the desired adjustment, once achieved. Often, prior thrust assemblies have utilized circumferential friction clamp means engaging the roll neck to maintain the desired adjustment. Such a clamping mechanism is not sufficiently positive to ensure maintenance of a specified adjustment and often may loosen or move due to vibration. Such movement generally would be unknown to the mill operators and could result in rapid wear of the bearings to the point of catastrophic failure.

Still another shortcoming of the prior bearing thrust assemblies has been the rough or course nature of the bearing thrust adjustment process, owing to the use of high friction mechanisms such as frictionally engaged ramps or the like on relatively rotatable rings encompassing the roll neck. Manual adjustment of such ramp mechanisms requires an operator to develop a rather sensitive feel for the point of proper thrust adjustment. The inherent difficulty in achieving this end has been increased by the high friction force between confronting ramp elements in prior bearing thrust assemblies. With such friction force to be overcome, the feel of proper bearing thrust adjustment is largely obscured and the likelihood that proper adjustment will be achieved is correspondingly reduced.

Yet another shortcoming of prior bearing thrust assemblies for rolling mills has been the difficulty encountered in retrofitting a universal bearing thrust assembly to a wide variety of different mill roll neck designs and specifications.

For the above and numerous other reasons, practitioners of the art have continually sought to improve existing mill bearing thrust assemblies.

BRIEF SUMMARY OF THE INVENTION

The present invention contemplates a novel and improved mill bearing thrust assembly which is quickly and conveniently installed on and disassembled from a rolling mill, and which offers the benefit of smooth, sensitive, sure and easy adjustment of bearing thrust and positive thrust adjustment retention.

The invention contemplates, in one presently preferred embodiment thereof, a bearing thrust assembly which may be released and disassembled from a roll neck without removing so much as a single part therefrom. The entire thrust assembly is received endwise onto the free end of the roll neck and is locked in place thereon by tightening down two threaded fasteners. The thrust adjustment is made by rotating a ring portion of the thrust assembly in somewhat similar fashion to thrust adjustment in prior thrust assemblies, but in the present invention the adjustment, once achieved, is positively retained against all force inputs, including most notably mill vibration, by a wedging clamp action that requires only the tightening down of two other threaded fasteners. The invention also contemplates angled links or dogs disposed between the relatively rotatable spacer ring and thrust ring of a bearing thrust assembly and pivotally engaged therewith to impart axial movement to the spacer ring in response to rotary movement of the thrust ring. This offers a low friction, reliable and simple bearing thrust adjustment. Because the angled links provide a greater angle of attack or leverage than conventional ramp arrangements, they offer the lower friction alluded to as well as shorter throw and more position "feel" of the proper bearing thrust adjustment.

The invention thus offers a mill bearing thrust assembly which is easy to adjust and lock, which provides positive and sure maintenance of the selected thrust adjustment, and which can quickly and conveniently be disassembled from and reinstalled on a roll neck as a unit.

It is therefore one object of the invention to provide a novel and improved mill bearing thrust assembly.

A more specific object of the invention is to provide a bearing thrust assembly with a reduced friction, short throw bearing thrust adjustment to enhance the ease of manual thrust adjustment by mill operators. A further object of the invention is to provide a bearing thrust assembly with positive retention of a selected thrust adjustment within a range of available adjustments. Still another object of the invention is to provide a bearing thrust assembly which may be removed from and reinstalled on a roll neck as a unit without disassembly of individual bearing thrust assembly components therefrom.

These and other objects and further advantages of the invention will be more readily appreciated upon consideration of the following detailed description and the accompanying drawings in which.

Figure 1:
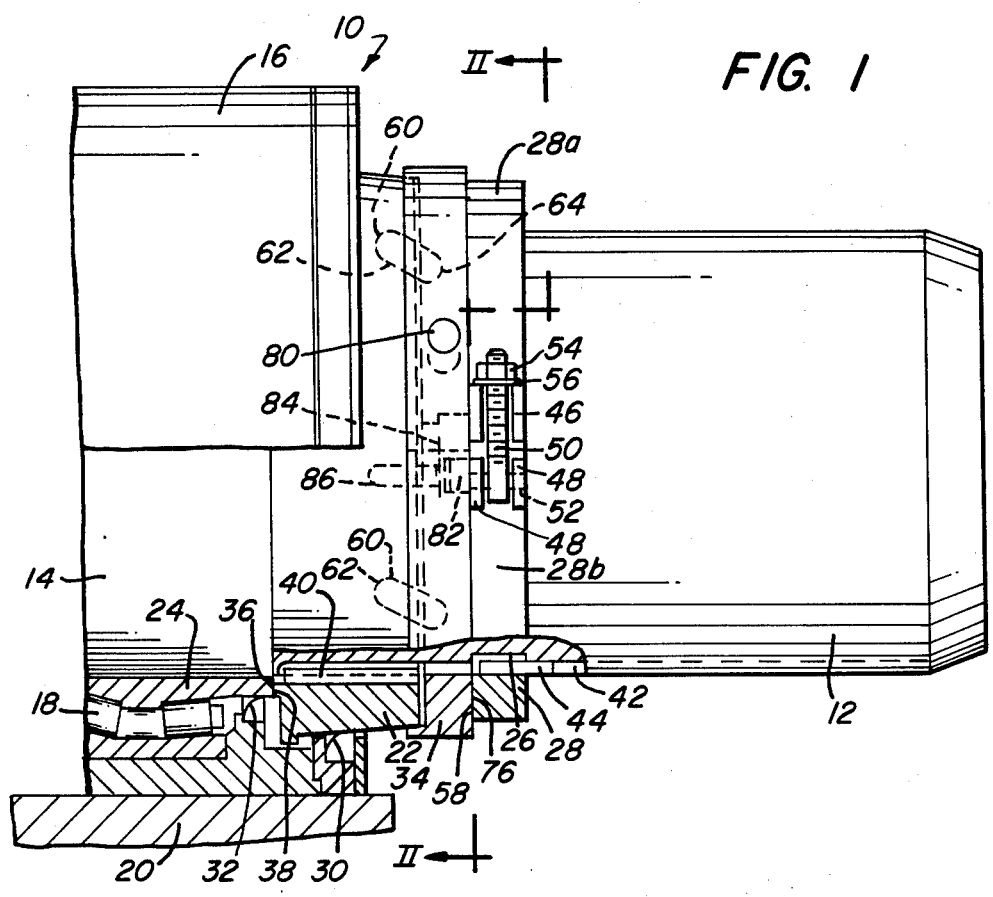
FIG. 1 is a side elevation, partially sectioned, of a mill roll neck with a bearing thrust clamp assembly of the present invention installed thereon.

There is generally indicated at 10 in FIG. 1 a bearing thrust assembly shown installed on the neck portion 12 of a roll 14 of a well known type such as used commonly in metal sheet or strip rolling mills.

As is well known, the roll 14 is mounted in a bearing box or chock 16 by means of suitable bearings such as roller bearings 18. The chocks 16 at each end of each roll 14 are supported by the roll stand 20 whereby the roll 14 is axially rotatable in the roll stand 20 for the well known purpose of rolling sheet or strip from slab stock.

To retain bearings 18 in their proper position on roll 14, conventional mill rolls have also been provided with a suitable spacer ring 22 which extends intermediate the inner race 24 of the bearing 18 and the remainder of the bearing thrust assembly 10. Similarly, conventional mill rolls have been provided in their neck portion 12 with a circumferential groove 26 which receives a clamp ring portion 28 of the thrust assembly 10 to provide a longitudinal stop which bears the axial thrust loads that are applied by the thrust assembly 10 to the bearing 18.

Also shown in FIG. 1 are conventional lubricant seals such as wiping seals 30 and 32 which extend circumferentially of the roll and bearing structure intermediate relatively rotating and non-rotating elements of the roll support structure to prevent entry of dirt and debris which could foul the bearings 18, and to prevent escape of lubricant therefrom.

Inasmuch as the above-described elements are common to many conventional mill rolls support structures and are well known to those versed in the art, it is believed further detailed description thereof is unnecessary for an understanding of the present invention.

The invention concerns the novel and improved mill roll bearing thrust assembly 10 as shown in FIG. 1 and comprising the axially spaced apart clamp ring 28 and spacer ring 22, and an axially intervening thrust ring 34, all of which encompass roll neck 12. An inner axial end 36 of spacer ring 22 is disposed in confronting relationship with an adjacent axial end 38 of inner bearing race 24 for application of axial thrust loads thereto. The spacer ring 22 is non-rotatably secured with respect to roll neck 12 by means of a key 40 that is engaged within an axially extending key slot 42 formed in roll neck 12. Similarly, clamp ring 28 is non-rotatably affixed with respect to roll neck 12 by means of a key 44 residing in key slot 42 adjacent to clamp ring groove 26.

Thrust ring 34 is axially rotatable with respect to both the spacer ring 22 and clamp ring 28, and is cooperable with both upon rotation thereof to move spacer ring 22 axially to engage the confronting surfaces 36 and 38 and thereby apply axial thrust to bearing race 24.

Figure 2:
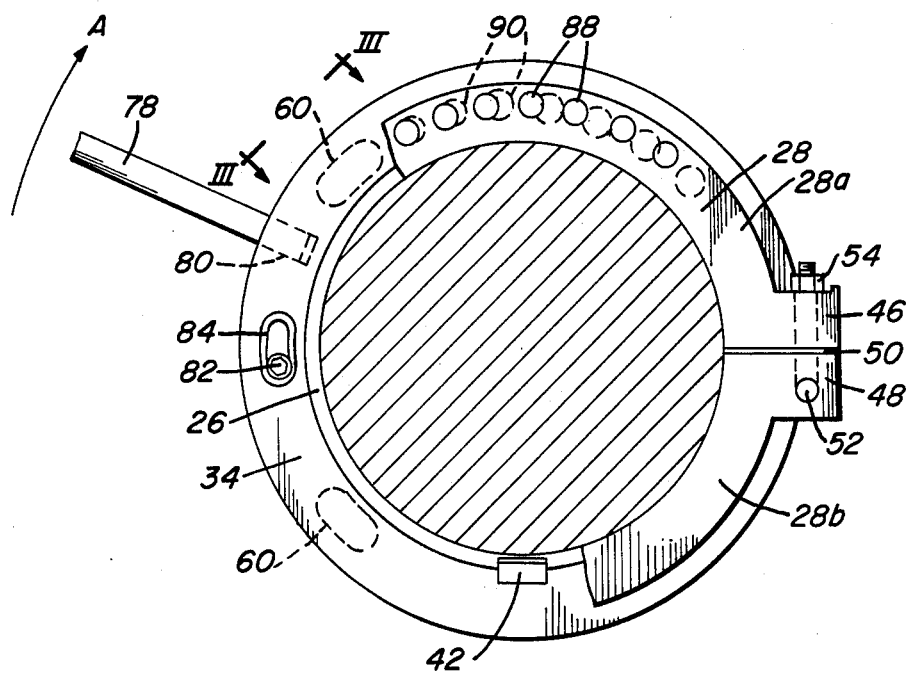
FIG. 2 is a sectional view taken on line II—II of FIG. 1.

As shown in FIGS. 1 and 2, clamp ring 28 comprises a pair of semi-circular ring elements 28a, 28b which have cooperating, spaced apart pairs of lug portions 46, 48 projecting radially outward adjacent the opposite ends thereof. A threaded toggle bolt 50 is pivotally affixed between each pair of lugs 48 as by means of a pivot pin 52. In assembly of clamp ring 28 to roll neck 12, the ring elements 28a and 28b are assembled into roll neck groove 26 with key 44 assembled into slot 42 to retain the respective ring element 28b non-rotatably with respect to roll neck 12. Each of toggle bolts 50 is then pivoted to a position intermediate the adjacent lugs 46 and a nut 54 and washer 56 are threaded thereon and tightened down to draw the ring portions 28a and 28b together adjacent their opposite ends. Accordingly, clamp ring 28 is fixedly but releasably secured on roll neck 12 in the groove 26 and is non-rotatably retained not only by the circumferential clamping forces of bolts 50 and nuts 54, but more importantly by the key 44.

Figure 3:
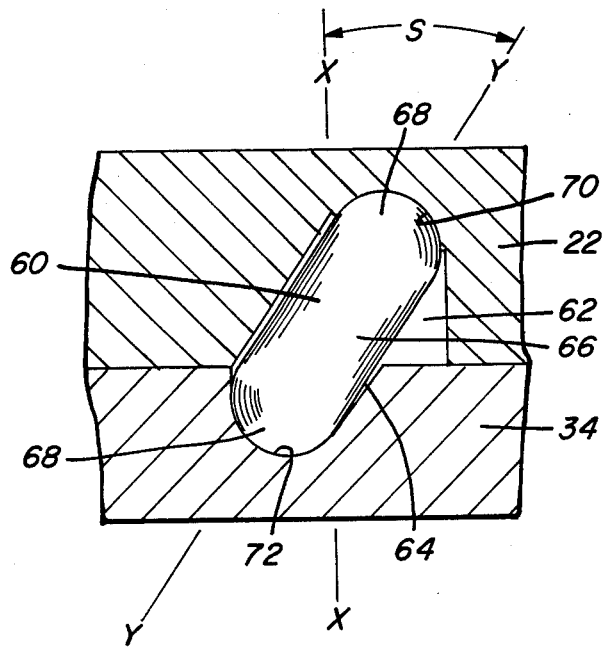
FIG. 3 is a sectional view taken on line III—III of FIG. 2.
Figure 4:
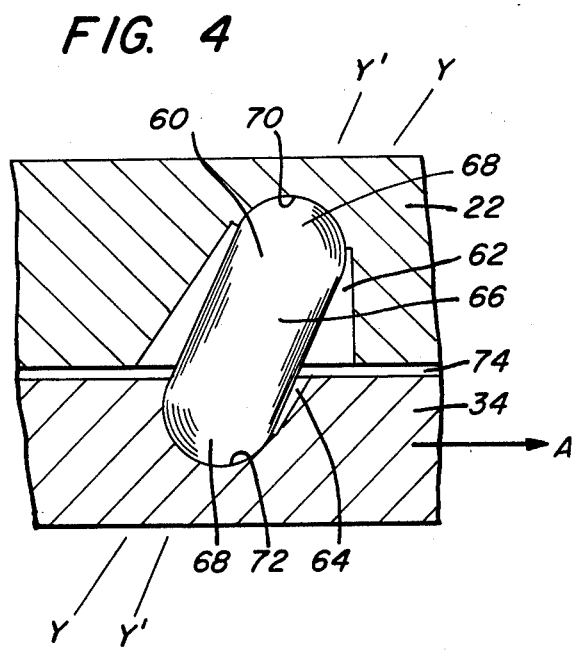
FIG. 4 is a sectional view similar to FIG. 3.
Figure 10:
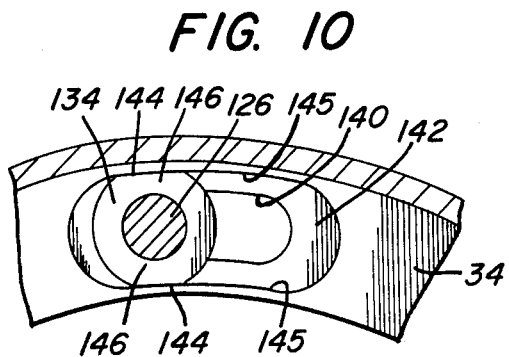
FIG. 10 is a fragementary section taken on line X—X of FIG. 9.

The axially inward annular surface 58 of clamp ring 28 provides a reaction or bearing surface against which thrust ring 34 may bear during application of thrust to bearings 18. Such thrust is applied by means of a plurality of angeled links or dogs 60 extending intermediate adjacent confronting recesses 62 and 64 formed, respectively, in spacer ring 22 and thrust ring 34 as best shown in FIGS. 3 and 4. A plurality of at least 3 of the links 60 are spaced uniformly about the circumference of the annular interface between spacer ring 22 and thrust ring 34. Preferably as many as 6 or 8 links 60 may be incorporated in the structure.

Each of the links 60 preferably comprises a rigid, elongated cylindrical body member 66 having spherically formed axial end portions 68 that are received into cooperating spherical portions 70, 72 of recesses 62 and 64, respectively. Accordingly, each link 60 forms a pivotal connection between spacer ring 22 and thrust ring 34 by engaging rings 22 and 34 in pivotal ball joint connections which permit relatively rotational movement between the rings 22 and 34. Furthermore, each link 60 is dispossed with the longitudinal axis Y—Y thereof disposed at a predetermined skew angle with respect to the common longitudinal axis X—X of rings 22 and 34, as shown in FIG. 3. Accordingly, relative rotary movement between rings 22 and 34, as by rotation of ring 34 in the direction indicated by arrow A in FIG. 4 will reduce the angle of skew between links 60 and the axis X—X and thereby increase the spacing between rings 22 and 34 in the axial direction X—X. That is, the axial component of the clearance between ball socket recesses 70 and 72 which is necessary to accommodate the length of links 60 increases as the axis of the link 60 is moved closer to alignment with axis X—X. For example, as shown in FIG. 4, when rotation of ring 34 in the direction A with respect to ring 22 moves the links 60 from a position in alignment with axis Y—Y to alignment with axis Y'—Y', spacer ring 22 is forced axially away from thrust ring 34 to create a clearance 74 therebetween. Sufficient rotation of thrust ring 34 in the direction A will bring surface 36 of ring 22 into engagement with surface 38 of the bearing race 24 and thus apply axial or longitudinal thrust thereto. Of course, it will be understood that the direction of relative rotation of ring 34 may be reversed to decrease the axial thrust load and increase bearing clearance. Also, the rotary directions for increasing and reducing bearing clearance may be reversed by merely reversing the orientation of links 60.

To support the thrust loads transmitted from thrust ring 34, the outermost annular surface 76 of thrust ring 34 bears upon the above described reaction surface 58 of clamp ring 28.

From the above it will be seen that by inserting a suitable lever such as member 78 into a cooperating blind radial bore 80 formed in thrust ring 34, and rotating same in the direction A as shown in FIGS. 2 and 4, a desired thrust load may be applied to bearings 18 to insure proper bearing seating and elimination of excess bearing freeplay.

As can be seen in FIGS. 1 and 2, the thrust ring 34, spacer ring 22, and intervening links 60 are maintained as a unit by means of threaded fasteners 82 which are disposed within circumferentially extending slots 84 formed in thrust ring 34 and are threadedly engaged within cooperating threaded bores 86 formed in spacer ring 22. The leads of fasteners 82 do not engage ring 34 tightly, but instead are positioned to provide clearance for the requisite relative rotary and axial movement between rings 34 and 22.

In order to maintain the selected thrust established by rotary movement of thrust ring 34 as above described, thrust ring 34 and clamp ring 28 are provided with a vernier adjustment and locking mechanism in the form of a plurality of circumferentially distributed, evenly spaced axial through bores 88 formed in ring 28 which register with a corresponding plurality of axial through bores 90 formed in thrust ring 34. Spacing between adjacent bores 90 is greater than the spacing between adjacent bores 88 such that for each successive small increment of rotary movement by thrust ring 34 with respect to clamp ring 28, a different pair of bores 88, 90 are aligned. Bores 90 are threaded to receive threaded fasteners 91 passed through respective bores 88 such that the rotary position of thrust ring 34 may be adjusted in small increments and locked in place by a threaded fastener 91 engaged in one of bore pairs 88, 90. Thus whichever of the bore pairs 88, 90 is most closely in axial alignment for the desired rotary position of thrust spring 34, that pair of bores 88, 90 receives a bolt 91 which is tightly engaged therein to rigidly but releasably secure the selected thrust adjustment.

Figure 5:
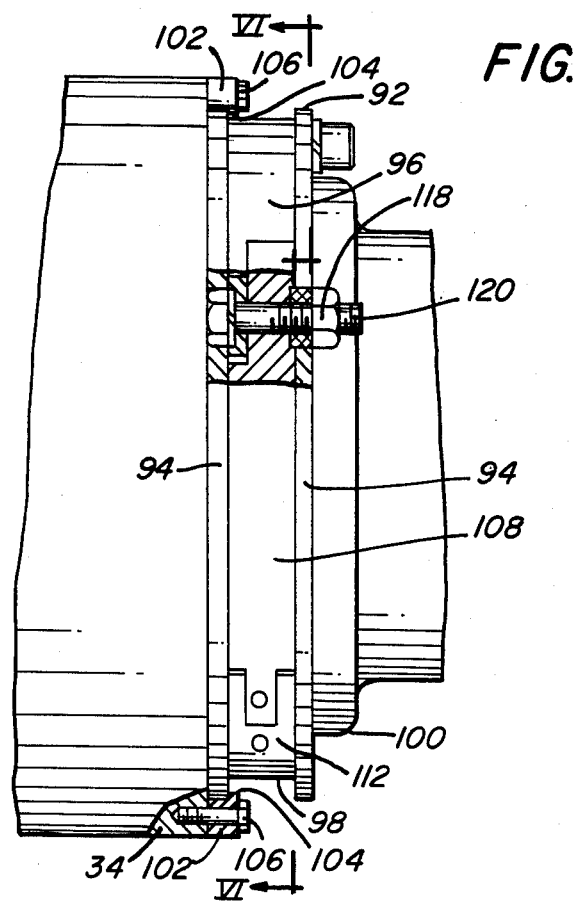
FIG. 5 is a side elevation, partially sectioned, showing an alternative embodiment of the invention.
Figure 6:
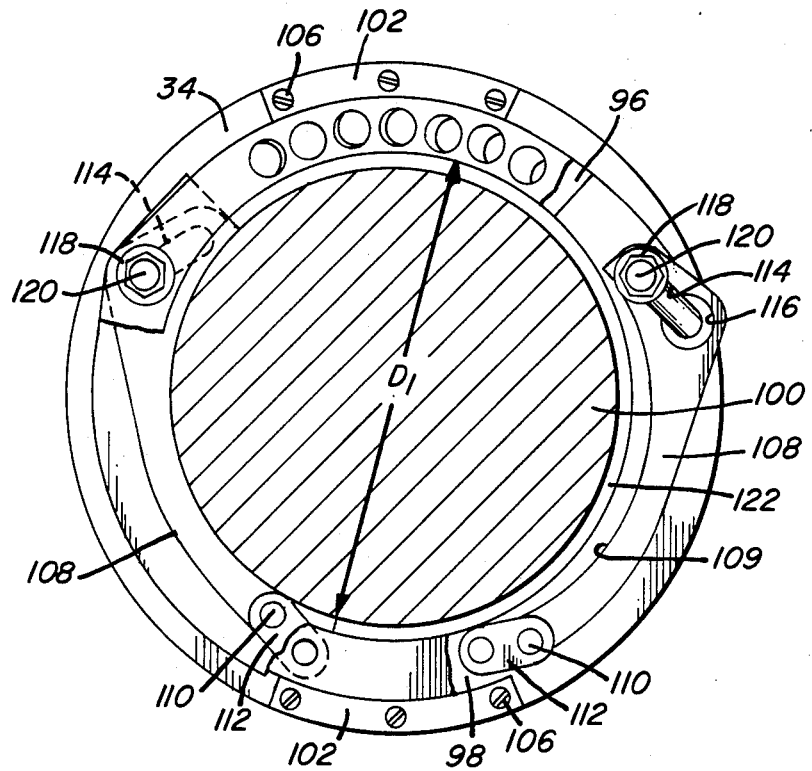
FIG. 6 is a sectional view taken on lines VI—VI of FIG. 5.
Figure 7:
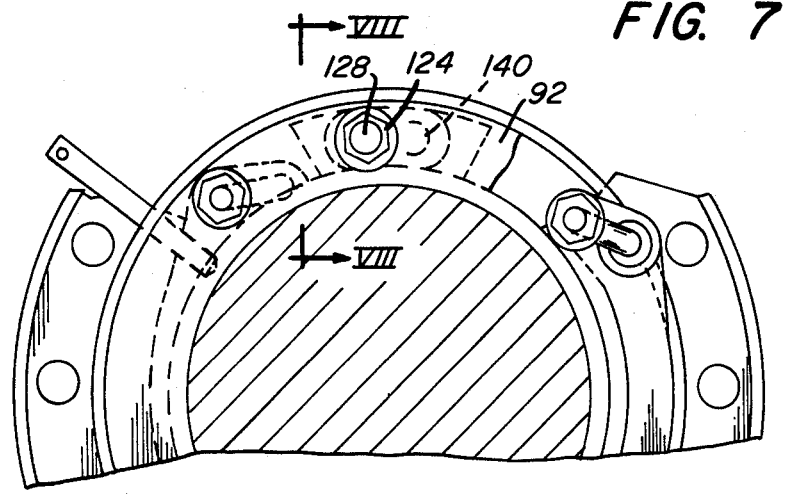
FIG. 7 is a fragmentary cross-sectional view taken generally on the same plane as FIG. 6 and showing another alternative embodiment of the invention.
Figure 8:
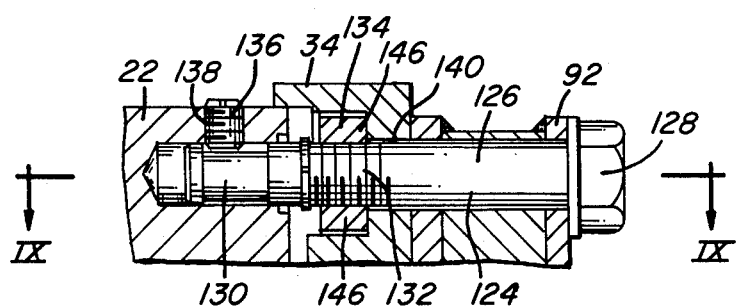
FIG. 8 is a fragmentary section taken on line VIII—VIII of FIG. 7.
Figure 9:
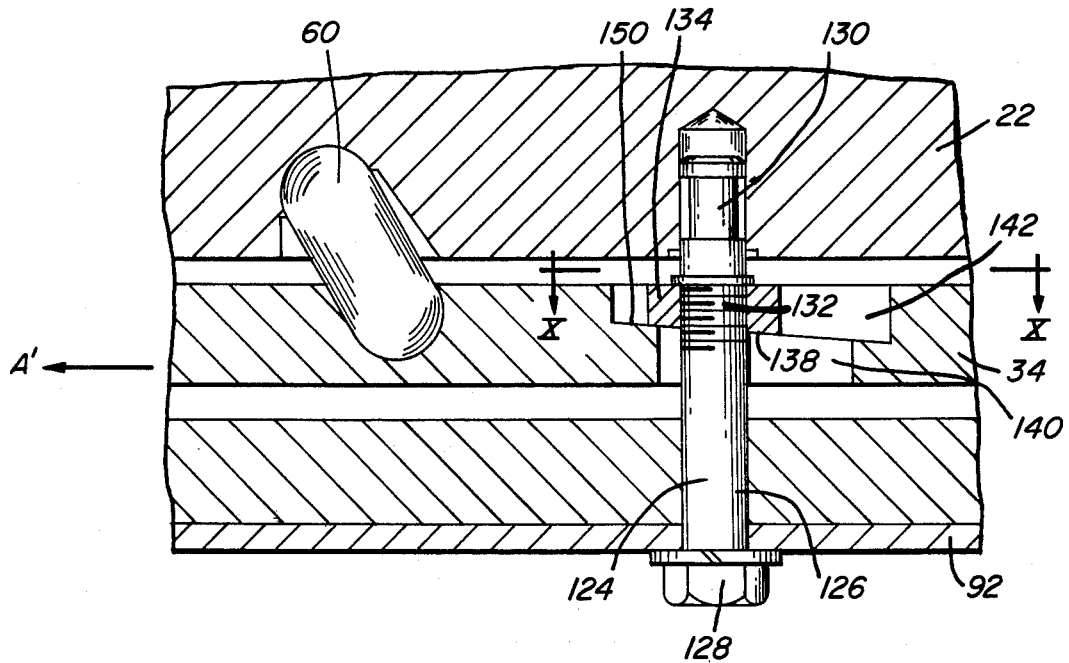
FIG. 9 is a fragementary section taken on line IX—IX of FIG. 8.

An alternative embodiment for the clamping ring of this invention is shown in FIGS. 5 and 6 as a ring assembly 92 comprised of a pair of axially spaced apart, generally annular ring flange elements 94 welded to intervening upper and lower filler elements 96 and 98.

The inner diameter D1 of flange elements 94 is selected to permit close sliding fit of ring assembly 92 on the roll neck 100. Arcuate retention members 102 are provided adjacent outer peripheral portions of ring 92 and at diametrically opposed locations to retain ring 92 with respect to the thrust ring. Specifically, each retention member 102 includes an inturned flange or lip portion 104 which projects over and captively retains the periphery of the adjacent ring flange member 94. Each of retention members 102 is secured to the thrust ring as by threaded fasteners 106 whereby clamp ring assembly 92 is retained axially adjacent to, but is also freely rotatable with respect to the thrust ring. Accordingly, with this embodiment of the invention the spacing ring, thrust ring and clamp ring may be disassembled from and reinstalled on a roll neck as a single unit by merely sliding the entire assembly over the free end of the roll neck.

To retain the thrust assembly of FIGS. 5 and 6 in place on the roll neck, clamp ring assembly 92 is provided with a pair of arcuately formed, pivotally retained members 108 which are pivotally secured intermediate ring flange elements 94 on diametrically opposed sides of ring assembly 92 as by pivotal connection at 110 to a pivoted toggle or, shakel 112. At the opposite end each arcuate member 108 is provided with an elongated slot 114 having an outer end portion 116 thereof which is counterbored to receive a nut and integral washer 118 that is threaded onto a stud or bolt 120.

The upper end of each member 108 thus is free to slide within the limits of the length of slot 114 upon bolt 120 when nut and washer 118 are loosened. This available free motion, together with the free motion afforded by pivoted toggles 112, allow members 108 to be selectively positioned to clear the diameter D, and thus permitting assembly 92 over the roll neck 100 as shown on the right side of FIG. 6. With ring assembly 92 in place on the roll neck, members 108 are movable radially inward to engage within a circumferential groove 122 of the roll neck 100 as shown on the left side of FIG. 6. Preferably, each arcuate member 108 is provided with an inner arcuate surface 109 of a radius corresponding to the radius of groove 122 such that upon movement of the arcuate members 108 into engagement within groove 122, nut and washer 118 may be tightened down and engaged within counterbore 116 to positively and rigidly retain ring assembly 92 in fixed engagement within groove 122. Of course, ring assembly 92 is also provided with keyed engagement with a longitudinal key slot in the roll neck 100 as described with regard to the FIGS. 1 and 2 embodiment hereinabove. Such a key and slot engagement together with the engagement of members 108 within groove 122 positively secures ring assembly 92 both axially and rotationally with respect to roll neck 100.

FIGS. 7 through 10 illustrate an alternative embodiment to be used in lieu of the bores 88, 90 to retain a selected rotational position of the thrust ring and to provide for continuous, rather than incremental thrust adjustment. Specifically, in lieu of bores 88, 90, the thrust assembly of FIG. 7 comprises a clamp ring assembly such as the assembly 92 above described and the thrust ring 34 for applying thrust via spacer ring 22 to a bearing as above described. In lieu of the bores 88, 90, the FIG. 7 embodiment is provided with a wedging assembly 124 comprised of an elongated fastener 126 having a head portion such as a hex head 128 adjacent the outer end thereof and a reduced diameter neck portion 130 adjacent the inner end thereof. Intermediate the longitudinal ends thereof, fastener 126 is provided with an axially extending threaded region 132 onto which there is threaded a wedge shaped nut member 134.

Fastener 126 resides within aligned bores formed in rings 92, 34 and 22 and is retained therein as by a set screw 136 threaded into a bore 138 in spacer ring 22 and engaging the reduced diameter neck portion 130 of fastener 126.

Because the thrust ring 34 and spacer ring 22 must be both axially and rotationally movable relative to each other to provide the desired thrust application as above described, the neck portion 130 of the fastener 126 is elongated to permit a degree of free axial movement of ring 22 with respect to ring 34. In addition, the bore in thrust ring 34 through which fastener 126 passes is formed as an elongated circumferentially extending slot 140 having a counterbore portion 142 within which wedging nut 134 resides. As will be seen from FIG. 10, nut 134 has flats or flank portions 144 which engage longitudinal sidewalls 145 of the counterbore 142 to permit longitudinal sliding movement of nut 134 within counterbore portion 142 and in addition to preclude rotation of wedging nut 134.

A wedging surface 148 of nut 134 is inclined with respect to the plane P—P that is perpendicular to common axis of rings 92, 22 and 34. Surface 148 confronts a parallel wedging surface 150 formed in the base of counterbore 142. Thus, from FIG. 9 it will be seen that the wedging angle of nut 134 corresponds to the wedging angle of surface 150. Accordingly, for any given position of wedging assembly 124 within the longitudinal extent of slot 140, head 128 may be turned to tighten down the nut 134 against surface 150. To preclude loosening or backing off of thrust ring 34 from the selected rotary position thereof. This provides for positive retention of the selected degree of thrust as will be more clearly understood on further reference to FIG. 9 wherein one of the links 60 is shown extending intermediate spacer ring 22 and thrust ring 34 in an alternative orientation from that shown in FIGS. 3 and 4, which reverses the effect of thrust ring rotation in opposite rotary directions. Thus, upon relative rotation of thrust ring 34 in the direction A' with respect to ring assembly 92 and spacer ring 22, links 60 are rotated as above described to establish the desired bearing thrust. While the selected degree of thrust is manually maintained, fastener head 128 is turned to clamp nut 134 against the surface 150 of counterbore portion 142 whereby ring 34 is rigidly clamped with respect to ring assembly 92. Of course, by moving further in the direction A', the ring 34 would be loosened as the engaged wedging surfaces of counterbore 142 and nut 134 would become disengaged; however, further movement in direction A' is not possible as a thrust load is already being applied to the bearings through links 60, and a further substantial rotary impetus would be necessary to increase that thrust load. More significantly, however, movement of ring 34 in the rotary direction opposite the direction A' is not possible since this would result in increased wedging of nut 134 against counterbore surface 150. The result is a positive retention of a selected level of bearing thrust with quick and convenient readjustment thereof throughout a continuously variable range of adjustment.

As may be readily appreciated from the above description, the present invention affords numerous advantages over prior roll bearing thrust structures including ease of assembly and disassembly from the roll neck, reliable and easy adjustment of thrust loads, positive maintenance of selected thrust loading, a continuous range of adjustment of thrust ring positions, and unitized installation and removal of the bearing thrust assembly over the free end of the roll neck. These and other advantages dramatically reduce the time and effort involved in the necessary operations of stripping or dechocking bearings from a roll, installing the bearings on a new roll, and selecting and retaining the desired bearing thrust.

Of course, I have envisioned other embodiments and modifications to the invention, and such certainly would also occur to those versed in the art, once apprised of my invention. Accordingly, it is my intent that the invention be construed broadly and limited only by the scope of the claims appended hereto.

I claim:

1. In a bearing thrust apparatus which is adapted to be received on the roll neck of the mill roll and is operable to selectively apply thrust loads to the roll bearings, the combination comprising:

a clamp ring adapted to be received coaxially on such a roll neck and releasably secured thereon in a fixed axial and rotary orientation with respect thereto;

a spacer ring adapted to be received coaxially on such a roll neck in rotationally fixed orientation with respect thereto and in axially movable relation with respect to said clamp ring;

said spacer ring including contact means for engaging such roll bearings to impart such axial thrust loads thereto;

a thrust ring adapted to be received coaxially on such a roll neck axially intermediate said spacer ring and said clamp ring and being axially rotatable with respect to such a roll neck;

link means cooperable with said spacer ring and said thrust ring to impart axial motion to said spacer ring in response to axial rotation of said thrust ring to apply such thrust loads to such roll bearings; and interengagement means cooperable with said thrust ring and said clamp ring to positively retain said thrust ring in any of a plurality of rotary positions thereof with respect to said roll neck.

2. The combination as claimed in claim 1 wherein said link means includes a plurality of links extending intermediate said spacer ring and said thrust ring.

3. The combination as claimed in claim 2 wherein said plurality of links includes rigid elongated links pivotally engaging said spacer ring and said thrust ring.

4. The combination as claimed in claim 3 wherein said rigid elongated links pivotally engage said thrust ring through ball and socket joints located adjacent the longitudinal ends of each said elongated link.

5. The combination as claimed in claim 4 wherein said plurality of links is distributed circumferentially of the interface between said spacer ring and said thrust ring.

6. The combination as claimed in claim 5 wherein said spacer ring and said thrust ring are coaxially affixed together in relative rotational engagement to form a unitized bearing thrust assembly which is adapted to be removed from and installed on such a roll neck as a unit by axial sliding thereof onto the free end of such a roll neck.

7. The combination as claimed in claim 1 wherein said interengagement means includes vernier adjustment means for retaining said thrust ring in any of a plurality of incrementally spaced relative rotary positions with respect to said clamp ring.

8. The combination as claimed in claim 7 wherein said vernier adjustment means includes a first plurality of axially extending through bores distributed circumferentially of said clamp ring at uniform spacing and a second plurality of corresponding axially extending bores distributed circumferentially of said thrust ring at a uniform spacing which bears a vernier adjustment relationship to said first plurality of bores in a manner to provide for coaxial alignment between successive pairs of bores of said first and second pluralities of bores at predetermined increments of relative rotation which define said plurality of rotary positions of said thrust ring.

9. The combination as claimed in claim 8 additionally including fastener means selectively releasably engageable in any of said pairs of coaxially aligned bores to secure said thrust ring in any selected one of said plurality of rotary positions.

10. The combination as claimed in claim 1 wherein said interengagement means includes wedging clamp means cooperable with said thrust ring and said clamp ring to rotationally clamp said thrust ring with respect to said clamp ring.

11. The combination as claimed in claim 10 wherein said wedging clamp means includes an axial drive means engaged in coaxially aligned through apertures in said clamp ring and said thrust ring, and a wedging member engaged on said axial drive means and having a wedging surface which is inclined to the axis of rotation of said thrust ring and is engagable with a complementary inclined surface of said thrust ring to clamp said thrust ring with respect to said clamp ring in a manner that the wedging action of said wedging member precludes relative rotary movement of said thrust ring in the rotary direction which would reduce such thrust loads.

12. In a bearing thrust apparatus for applying thrust loads to the bearings of a roll for a rolling mill wherein said apparatus includes a pair of relatively rotationally and axially movable ring elements which assume a predetermined relationship of axial spacing therebetween in response to relative rotation thereof within a range of relative rotational positions, the improvement comprising:

link means operatively interengaged between said ring elements in a manner to rotate between an less skewed orientation approaching axial alignment with respect to the axis of relative rotation of said ring elements, and a more skewed orientation with respect to said axis of relative rotation in response to relative rotation of said ring elements in opposite rotary directions to thereby respectively increase and decrease the axial spacing between said ring elements.

* * * * *